March 15, 1960 R. A. GILLETTE ET AL 2,928,481
MEANS FOR MOUNTING AN IMPLEMENT ONTO A TRACTOR
Filed Nov. 1, 1956

INVENTORS.
ROY A. GILLETTE
HAROLD A. RALSTON
BY: Emerson B Donnell
ATTORNEY

United States Patent Office 2,928,481
Patented Mar. 15, 1960

2,928,481

MEANS FOR MOUNTING AN IMPLEMENT ONTO A TRACTOR

Roy A. Gillette, Rockford, and Harold A. Ralston, Roscoe, Ill., assignors to J. I. Case Company, Racine, Wis., a corporation of Wisconsin Application November 1, 1956, Serial No. 619,801

5 Claims. (Cl. 172—273)

This invention relates to a means for mounting an implement on a tractor. Particular application of this invention is in the mounting of implements, such as row crop cultivators, on the front end of a tractor. Various provisions are already known for mounting a cultivator on a tractor, but these provisions require time, force, and special parts, in addition to elaborate structure for achieving the goal.

It is an object of this invention to provide a means for mounting an implement on a tractor in a short time and with little effort. In achieving this object, it is possible for one man to easily and readily accomplish the job, and the tractor can be readily released from the implement for performing other jobs when desired.

A specific object of this invention is to provide a means for mounting an implement on a tractor in a manner which will automatically align the mating parts of the tractor and the implement. The alignment of the mating parts insures that the implement will be properly positioned on the tractor.

Other objects and advantages will become apparent upon reading the following description in conjunction with the accompanying drawings, wherein.

The same reference numerals refer to the same parts throughout the several views.

Figure 1:
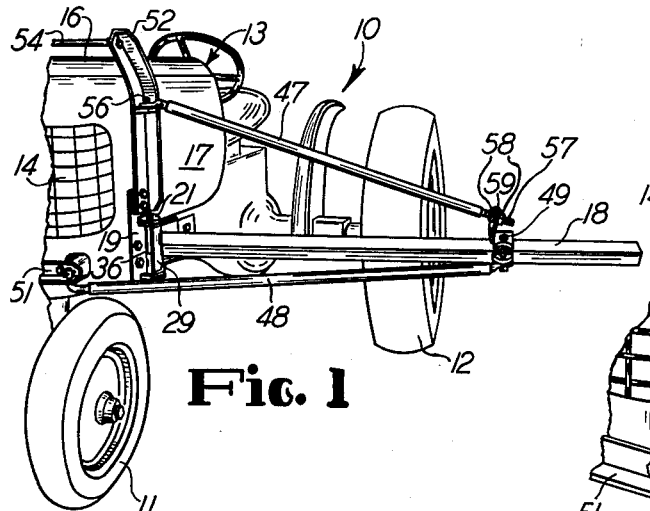
Fig. 1 is a front perspective view of a fragment of a tractor and showing an embodiment of this invention supporting a cultivator cross pipe on the tractor.
Figure 2:
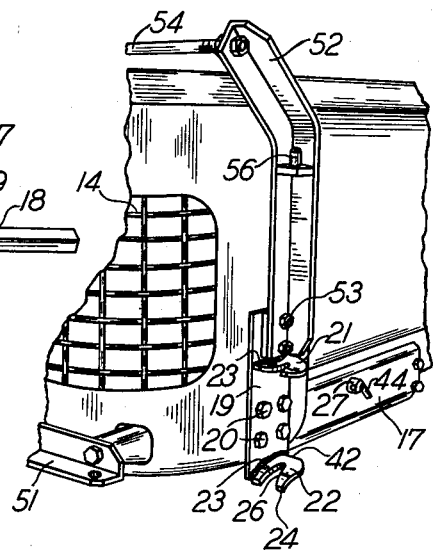
Fig. 2 is an enlarged view of a fragment of Fig. 1 and with parts removed.

Fig. 1 shows a fragment of a tractor 10 which includes the usual front wheel 11 and rear wheel 12 and the body 13 supported by the wheels. Also, the grille 14, hood 16, and side 17 are conventional tractor parts included in the body 13. Figs. 1 and 2 show that an implement or cultivator cross pipe or beam 18 can be mounted and dismounted with respect to the tractor. Of course, the cultivator would include the usual unshown parts such as the shovels, the rockshaft, the lift mechanism, the gauge wheels, etc. Since the unshown parts are all conventional and form no part of this invention, they need not be shown. It should also be understood that the opposite side of the tractor has an implement attached to it in the same manner as that shown and described with respect to the tractor near side and described hereinafter. This paired arrangement of implements is also conventional with tractor mounted cultivators.

A plate 19 is secured to each side of the tractor by bolts 20, and hook-like brackets or guides 21 and 22 are shown welded at 23 to the plate 19 in vertically spaced apart upper and lower positions. The guides 21 and 22 have angled ends 24, each of which includes a notch or anchor slot 26 opened toward the front of the tractor. Also, a pin 27 is stationarily attached to project from each side of the tractor, and it will be seen that the pin has a tapered end 28.

Figure 3:
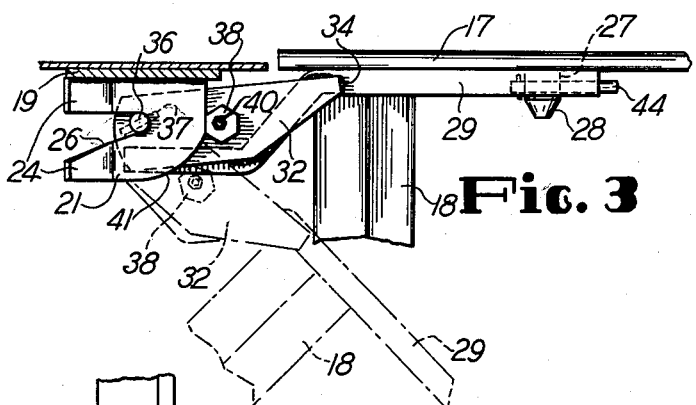
Fig. 3 is an enlarged plan view of a fragment of Fig. 1 with a part sectioned, and showing in dot-dash lines a second position of certain parts.
Figure 4:
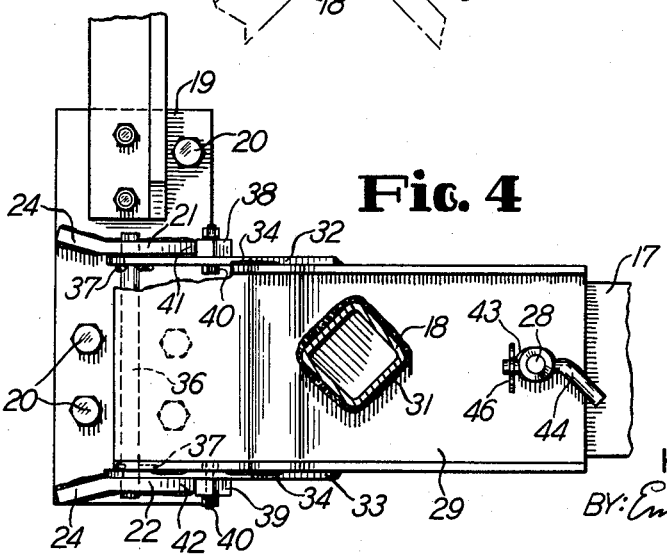
Fig. 4 is a side elevational view of Fig. 3 but with a part broken away.

Figs. 3 and 4 show that the laterally inward end of the beam 18 has an end or channel-shaped attaching plate 29 welded thereto at 31. The plate 29 has an upper plate 32 and a lower plate 33 welded thereto as at 34 to present flanges on the forward portion of the plate 29. A vertically disposed pivot or pin 36 extends through the plates 32 and 33 and pins 37 extend through the pin 36 and prevent the latter from moving axially and out of the plates 32 and 33. It should also be noticed that the pin 36 extends above and below the plates 32 and 33, respectively.

With the foregoing described arrangement, it should be understood that, prior to mounting the cultivator on the tractor, the beam 18 is initially disposed as shown by the dot-dash lines of Fig. 3. This disposition is common in the mounting of cultivators and should be familiar to those skilled in the art of making and using these cultivators. With the beam so disposed, the tractor 10 can be advanced until the notches 26 in the plates 21 and 22 receive the extended upper and lower ends of the pin 36. Of course the beam 18 is ultimately preferably disposed transverse to the tractor 10, which is the solid line position.

The swinging of the beam from the dot-dash line position to the solid line position has an important function in this invention. To this end, hexagonal members 38 and 39 are respectively attached by bolts 40 above and below the upper and lower plates 32 and 33. The members 38 and 39 are thus respectively disposed in the same horizontal planes as the plates 21 and 22 at least when the cultivator is finally mounted on the tractor. Fig. 3 shows that the rear edge 41 of the plate 21 is curved to have an irregular or cam shape. The plate 22 is similarly shaped at its rear edge 42. The notches 26 and the respective edges 41 and 42 are spaced apart and shaped so that the distance from the pin 36 to the members 38 and 39 is greater than the distance from the sides of the notches 26 to the sides of the respective edges 41 and 42. This distance relationship is shown in the dot-dash line position of Fig. 3, and, with these proportions, the members 38 and 39 are usually not in contact with the plates 21 and 22 at this stage of the mounting operation. This means, of course, that the operator can drive the tractor up to the pin 36, and the forward flare of the notch along with the spacing from the pin 36 to the members 38 and 39 allows sufficient tolerance in steering the tractor to have the notches 26 receive the pin 36.

Since the rear edges 41 and 42 of the plates increase toward the rear in their respective spacings from the notches 26, when the beam 18 is swung from the dot-dash line position of Fig. 3 to the full line position, the members 38 and 39 engage the edges 41 and 42, respectively. This arrangement creates a lever advantage as the beam 18 pivots about the pin 36. The pin 36 need not be fully seated in the notches 26 prior to swinging the beam 18 because the swinging movement will cause a camming action which will cause the pin 36 to become seated. An important result is that since the members 38 and 39 engage the edges 41 and 42, the plate 29 becomes locked on the plates 21 and 22, at least in the vertical direction. Also, since the members 38 and 39 are vertically spaced apart, the plate 29 vertically aligns with the plates 21 and 22 as the plate 29 is swung toward the tractor. The vertical alignment of the plate 29 assures that a slot 43 in the rear end of the plate will align with the guide pin 27 on the tractor. A lock pin 44 is then passed into the extending end of the pin 27 and a cotter pin 46 will secure the lock pin 44 which overlaps the slot 43 to prevent the plate 29 from swinging away from the tractor until the pin 44 is again removed. It will be noted that the slot 43 is elongated in the horizontal direction allowing the slot to clear the pin 27 in its swinging motion but also snugly receiving the pin 27 above and below the latter to provide vertical stability for the plate 29. In this arrangement, the edges 41 and 42 are cam surfaces or portions and the members 38 and 39 are cam followers.

Figs. 3 and 4 show that the members 38 and 39 are eccentrically attached to their mounting bolts 40. In this manner, the members 38 and 39 can be positioned on the plates 32 and 33 with a selected side of the members 38 and 39 facing the respective cam surfaces 41 and 42, and tightening of the bolts 40 will maintain the members 38 and 39 so faced. Thus, the distance between the pin 36 and the faces of the members 38 and 39 can be varied, and, in fact, the members 38 and 39 can be set at one time to give two different spacings between the respective faces of members 38 and 39 and the surfaces 41 and 42. Therefore, if the member 39 were set with one of its faces further from the pin 36 than the shown position of the member 38 in Fig. 3, then the beam 18 would cause the pin 36 to tilt with respect to the base of the notches 26 and thereby cause the beam to swing on a decline toward the pin 27, and this could align the hole 43 with the pin 27, and thereby effect the desired alignment of the hole 43 with the pin 27. These possible variations in the settings of the members 38 and 39 can be used to compensate for the normal manufacturing tolerances and for wearing of the parts.

With the foregoing described construction, the mounting and dismounting of the implement is accomplished without any bolting after the base plates are attached to the tractor, and even these base plates, as shown in Fig. 2, can be left on the tractor while the latter is used for other operations.

To further secure the implement to the tractor, it is preferred that two braces or trusses 47 and 48 be attached between the tractor and a bracket 49 on the beam 18. An angle iron 51 is suitably secured to the front of the tractor to receive one end of the lower truss 48. Also, an angle iron 52 is secured to the side of the tractor by bolts 53 and a tie rod 54 extends across the tractor to the opposite but unshown angle iron which is paired with the angle 52. The latter has a pivot pin 56 fastened thereto and disposed directly above the base of the notches 26. In mounting the implement, the pin 56 anchors one end of the truss 47 when the beam 18 is in the dot-dash position of Fig. 3. The beam is then swung to the full line position as the cam arrangement and the truss 47 guide the beam in its rearward swing. The truss 48 is finally attached to the iron 51 for stabilizing the implement.

It should also be noticed that the truss 47 is threaded at 57, and nuts 58 on the threaded end 57 and on each side of an upright plate 59 of the bracket 49 provide for adjustment in the effective length of the truss 47. The outer end of the beam 18 can be raised or lowered by this adjustment of truss 47.

While a specific embodiment of this invention has been shown and described, it should be obvious that certain changes could be made therein, and the scope of this invention should therefore, be limited only by the appended claims.

What is claimed is:

1. Attaching mechanism for use between a tractor and an implement of the type having an elongated tool carrying beam disposed transversely of the direction of travel, an attaching plate connected to said beam and disposed transverse thereto and extending forwardly and rearwardly with respect to said direction of travel, upper and lower flanges on the front portion of said plate, a substantially vertical pivot carried by said flanges, substantially vertically spaced hook-like supporting brackets attached to said tractor and engaged with said flanges and said vertical pivot and having rearwardly directed cam portions and being forwardly open with respect to said direction of travel, followers on said flanges engaged with said cam portions to hold said pivot within said hook-like brackets, said followers being positioned to swing clear of said cam portions when said tool carrying beam is swung forwardly, swinging said plate away from said tractor about said pivot to release said pivot from said hook-like brackets, said plate having an opening spaced rearwardly from said pivot and oriented in the plane of said swinging, a stationary pin on said tractor and disposed in said opening, and means locking said plate on said pin to prevent swinging of said plate, said means being disengageable for swinging of said plate for disengagement of said pivot from said hook-like brackets.

2. In a device for mounting implements on a tractor, the combination of a pair of vertically spaced forwardly open hook-like brackets fixed on the tractor, a stationary pin on the tractor rearwardly of said brackets and projecting outwardly from the side thereof, an attaching plate having upper and lower flanges on the portion thereof forwardly disposed with respect to said tractor and being engaged between said vertically spaced brackets, a substantially vertical pivot carried by said flanges and engaged in said hook-like brackets, said plate providing an opening engaging said pin, means locking said plate on said pin, said means being disengageable for swinging of said plate about said pivot, said brackets having cam surfaces rearwardly of said pivot, cam followers on said flanges engaged with said cam surfaces to hold said pivot in said hook-like brackets and swingable with said plate and flanges outwardly from said tractor about said pivot to release said pivot from said brackets, and a tool carrying beam fixed on said plate and extending outwardly therefrom and from said tractor transverse to the direction of travel thereof.

3. Attaching mechanism for use between a tractor and an implement of the type having an elongated tool carrying beam, a plate attached to one end of said beam and disposed transverse to said beam, a pivot pin attached to one end of said plate and disposed transverse to the axis of said beam, a supporting bracket engaged with each end of said pivot pin and having a cam portion spaced from each said end, a cam follower on said plate engaged with each said cam portion for securing said pivot pin engaged with said supporting bracket, said followers being positioned to swing clear of said cam portions when said tool carrying beam is swung in one direction, said plate having an opening at the other end thereof, a stationary pin disposed in said opening, and means for locking said plate to said stationary pin, said means being disengageable for swinging of said plate for disengagement of said pivot pin from said supporting bracket.

4. In a device for mounting an implement on a tractor, the combination of a pair of vertically spaced brackets fixed on the tractor and having openings at the front thereof, a stationary pin horizontally disposed on the side of said tractor and rearward of said brackets, a tool carrying beam, a pivot pin connected to said beam at one end thereof and disposed in said openings on said brackets, means for locking said beam and said stationary pin together, said means being disengageable for swinging of said beam about said pivot pin, said brackets having cam surfaces rearward of said pivot pin, mounting bolts on said beam spaced from said pin, and multifaced cam followers eccentrically mounted on said bolts for engagement with said cam surfaces to hold said pivot pin to said brackets.

5. In means for mounting an implement onto a tractor having a stationary pin on the side thereof and two vertically spaced apart guide plates with vertically aligned pin receiving openings and cammed edges rearwardly faced on said plates, the combination of a tool carrying beam, a pivot pin attached to said beam and disposed transverse to the axis of said beam and said pin being engageable in said pin receiving openings, abutment means attached to said beam and being movable toward and away from said pin for engaging said cammed edges of said guide plates to orient said beam with respect to said tractor upon sliding of said means along said edges, and said beam having a pin receiving opening thereon for engaging said stationary pin and releasably locking said beam to said tractor.

References Cited in the file of this patent

UNITED STATES PATENTS

| | | |
|---|---|---|
| 674,490 | Watkins | May 12, 1901 |
| 960,817 | Case | June 7, 1910 |
| 2,195,611 | Brown | Apr. 2, 1940 |
| 2,203,049 | Goserud | June 4, 1940 |
| 2,239,387 | Johnson | Apr. 22, 1941 |
| 2,346,330 | Ratcliff | Apr. 11, 1944 |
| 2,423,148 | Johnson | July 1, 1947 |
| 2,454,664 | McClean | Nov. 23, 1948 |
| 2,560,702 | Reaves | July 17, 1951 |
| 2,584,217 | Morkoski | Feb. 5, 1952 |